United States Patent [19]
Lutz

[11] Patent Number: 5,562,301
[45] Date of Patent: Oct. 8, 1996

[54] ASSEMBLY FOR MOUNTING AN AIR BAG COVER AND INFLATOR TO A STEERING WHEEL

[75] Inventor: Joachim Lutz, Schechingen, Germany

[73] Assignee: TRW Repa GmbH, Alfdorf, Germany

[21] Appl. No.: 232,744

[22] Filed: Apr. 25, 1994

[30] Foreign Application Priority Data

Apr. 26, 1993 [DE] Germany ................... 43 13 616.8

[51] Int. Cl.⁶ .................................................. B60R 21/16
[52] U.S. Cl. ........................................ 280/728.2; 280/731
[58] Field of Search .................. 280/728 A, 728 R, 280/728 B, 731, 732, 736, 741, 728.1, 728.2, 728.3

[56] References Cited

U.S. PATENT DOCUMENTS

| | | | |
|---|---|---|---|
| 4,325,568 | 4/1982 | Clark et al. | 280/731 |
| 4,752,083 | 6/1988 | Honda | 280/731 |
| 4,913,461 | 4/1990 | Cuevas | 280/731 |
| 5,096,222 | 3/1992 | Komerska et al. | |
| 5,275,431 | 1/1994 | Stephens | 280/728 A |

FOREIGN PATENT DOCUMENTS

| | | |
|---|---|---|
| 0447030A3 | 9/1991 | European Pat. Off. |
| 0485602A1 | 5/1992 | European Pat. Off. |
| 2500003 | 7/1975 | Germany ................ 280/731 |
| 4205727A1 | 9/1992 | Germany. |
| 2257400 | 1/1993 | United Kingdom. |

Primary Examiner—Karin L. Tyson
Attorney, Agent, or Firm—Tarolli, Sundheim, Covell Tummino & Szabo

[57] ABSTRACT

A vehicular gas bag restraining system including a folded gas bag (12) arranged behind a cover (10) and a gas generator (16) mounted on a supporting plate.(18), the folded gas bag (12) forming together with an anchoring plate (14) provided with a through-opening corresponding to the inflation opening (122) of said gas bag (12) a preassembled module which is inserted within the cover (10) and is jointed together with said supporting plate (18) in the axial direction of the gas generator (16).

14 Claims, 4 Drawing Sheets

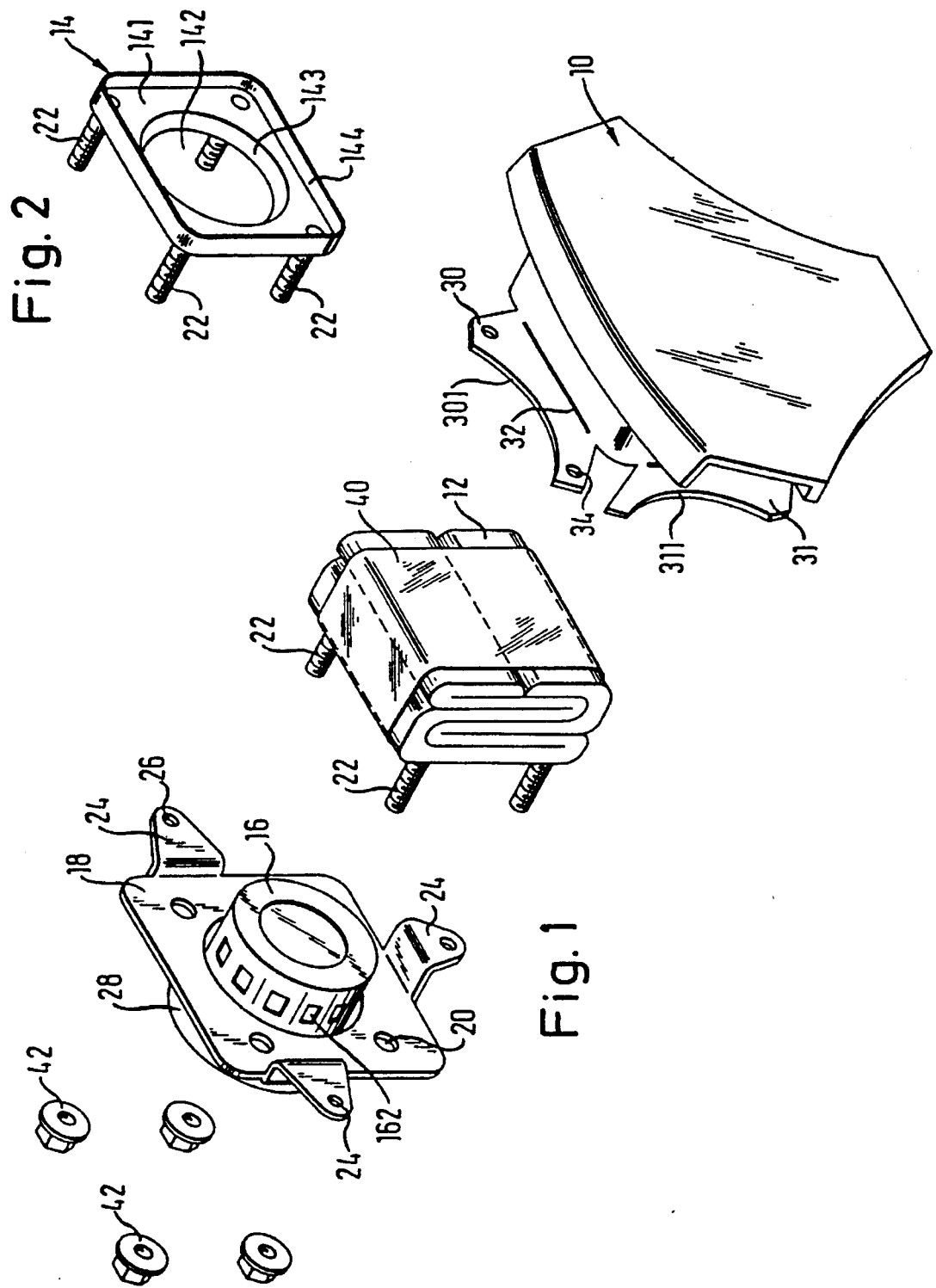

Section A-A

Detail X

Section B-B

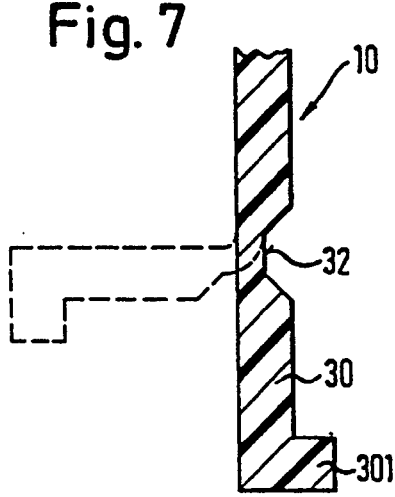
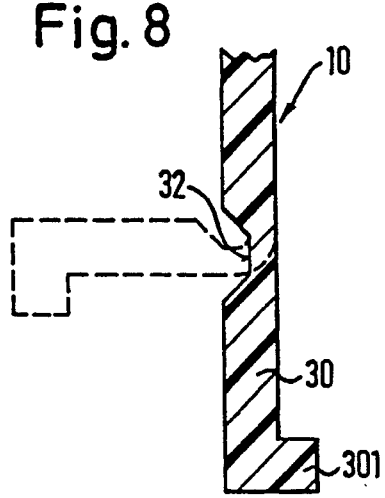
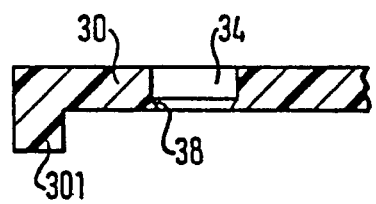
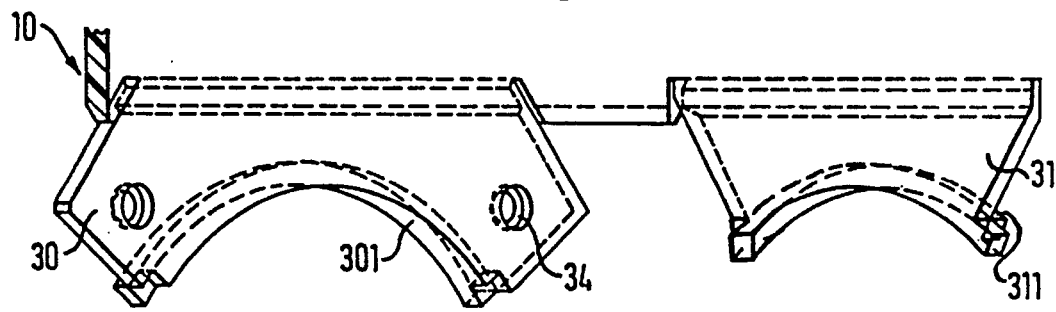

5,562,301

ASSEMBLY FOR MOUNTING AN AIR BAG COVER AND INFLATOR TO A STEERING WHEEL

The invention relates to a vehicular air bag restraining system including a folded air bag arranged behind a cover and a gas generator mounted on a supporting plate.

WO 90/03901 discloses a air bag restraining system including a supporting plate with an opening in which a gas generator is inserted. For securing to the supporting plate the gas generator is provided with molded wall parts for securing to the supporting plate. In addition, a fastener ring is provided in the air bag having hollow pins which engage the through-openings of the air bag and the supporting plate.. Rivets are inserted into these hollow pins with which they are pressed together. The air bag is pressed on to the supporting plate by the fastener ring. A cover surrounds the supporting plate, whereby it is also fixed to the supporting plate.

The object of the invention it to sophisticate a air bag restraining system of the aforementioned kind by simplifying production and installation of the gas bag restraining system.

This object is achieved for a air bag restraining system of the aforementioned kind by the folded air bag forming together with an anchoring plate provided with a through-opening corresponding to the inflation opening of the air bag a preassembled module which is inserted within the cover and is jointed together with the supporting plate in the axial direction of the gas generator. Accordingly, the unit made up of the air bag and the anchoring plate can be preassembled and stored independently of the fabrication of the supporting plate and the cover.

Assembly of the aforementioned module is further facilitated by the anchoring plate being provided with fastener bolts extending in axial direction through corresponding openings in the supporting plate and by the anchoring plate being clamped together with the supporting plate by nuts screwed onto the fastener bolts.

In accordance with one advantageous embodiment the cover is provided with wall parts which are bent inwards and clamped between the anchoring plate and the supporting plate, these bent wall parts being provided in particular with through-openings for the fastener bolts. These fastener bolts are inserted in the wall parts from within and then tightened together with the supporting plate by means of the nuts. By these means the cover can be easily and reliably fastened in place, and complete assembly of the air bag restraining system is in one direction only.

A further assembly of gas generator and supporting plate is easily formed so that assembly and storage are independent by providing the supporting plate with a recess and inserting the gas generator in this recess in the supporting plate. The gas generator may, for instance, be fixed by wall parts of the supporting plate in the recess which are turned radially inwards.

To maintain the air bag in its folded condition and to avoid detrimenting its predetermined fold during assembly it is surrounded by a film. This film can take the form of a shrinkage film or a film banderol which is torn apart by the inflation procedure or which can be removed after insertion in the cover.

Further advantages and features of the invention are disclosed by the following description of a preferred embodiment and by the drawing to which reference is made and in which:

FIG. 1 is a perspective exploded view of a air bag restraining system according to the present invention;

FIG. 2 shows an anchoring plate of FIG. 1;

FIG. 7 is a schematic section view through the hinge area of a wall part of the cover shown in FIG. 1;

FIG. 8 is a schematic section view through the hinge area of a wall part of the cover according to a further embodiment;

FIG. 9 is a section view of a wall part of the cover with a through-opening of FIG. 1;

FIG. 10 is a perspective partial section view of the cover in the non-assembled condition of FIG. 1.

Figure 3:
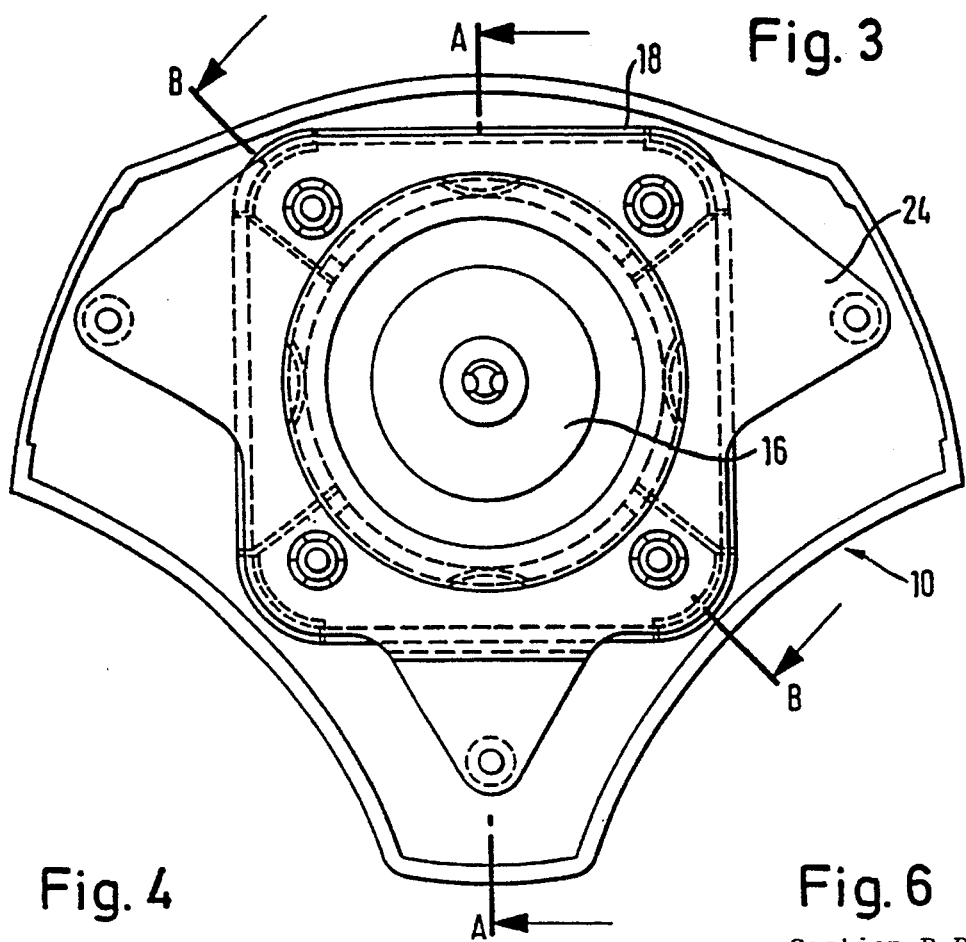
FIG. 3 is a view from underneath of the air bag restraining system shown in FIG. 1.

FIG. 1 shows a air bag restraining system according to the invention in a perspective exploded view. It substantially comprises a cover 10, a air bag 12, an anchoring plate 14 made of metal, a gas generator 16 and a supporting plate 18 also made of metal. The air bag 12 is fabricated of coated or uncoated fabric sections stitched together.

Figure 4:
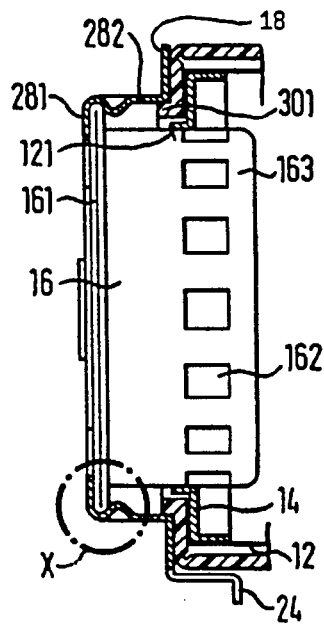
FIG. 4 is a partial section view along the line A—A of FIG. 3.
Figure 5:
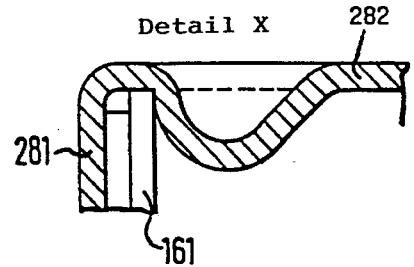
FIG. 5 is an enlargened detail view along line X of FIG. 4.
Figure 6:
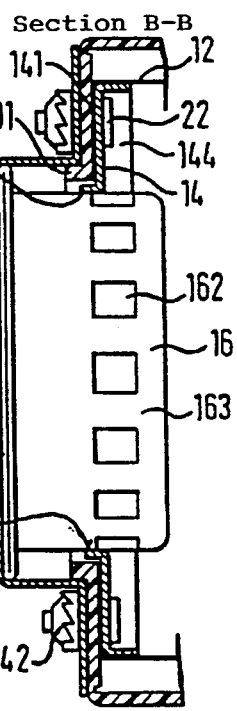
FIG. 6 is a partial section view along the line B—B of FIG. 3.

The supporting plate 18 is substantially square in shape and has four through-holes 20. These holes 20 receive the fastener bolts 22 of the anchoring plate 14. In addition, the supporting plate 18 is formed with three fastener pads 24 with holes 26. Via these fastener pads 24 the supporting plate 18 is secured to the vehicle by screws being inserted through these holes 26 and screwed to the vehicle. The supporting plate 18 has a cylindrical recess 28 in which the cylindrically formed gas generator 16 is inserted. The diameter of the recess 28 corresponds substantially to that of a widened end 161 of the gas generator (FIGS. 4 thru 6). This widened end 161 of the gas generator 16 is located on the floor 281 of the recess 28. The casing 282 of the recess 28 is partly formed bent inwards (FIGS. 3 thru 5) so that the diameter of the recess 28 is reduced and surrounds the widened end wall 161 of the gas generator 16 which is fixed in the recess 28 by caulking.

The gas generator 16 is provided with a plurality of gas outlet openings 162. These gas outlet openings 162 are located outside of the recess 28 in the part of the casing 163 of the gas generator 16 protruding through the inflation opening 121 of the air bag 12. By this arrangement the gas emerging from the gas generator 16 is able to flow into the air bag 12 directly.

The anchoring plate 14 is introduced into the inflation opening 121 of the air bag 12, the fastener bolts 22 of the anchoring plate 14 into the through-openings of the air bag 12 to receive the fastener bolts 22. The anchoring plate 14 comprises a disk-shaped wall part 141 having a circular recess 142 substantially corresponding to the inflation opening 121 of the air bag 12. This recess 142 is defined by an edge 142 bent with respect to the outside of the air bag 12, said edge extending vertically to the wall part 141 and cylindrical in shape (FIG. 2). The anchoring plate 141 is bent at its outer edge 144 vertically and opposite to the inner edge 143. In the assembled condition this inner edge 143 is in contact with the gas generator 16 and extends in the recess 28 of the anchoring plate 18 (FIG. 4, FIG. 6).

The cover 10 features four hinged wall parts 30, 31 connected to the cover 10 by the hinge 32 formed by a groove. Two opposing wall parts 30 are provided with through-openings 34 for receiving the fastener bolts 22. In the closed-hinge condition of the wall parts 30, 31 the cover 10 features a circular opening, the diameter of which substantially corresponds to that of the casing 163 of the gas generator 16. As best illustrated by FIG. 10 the wall parts 30, 31 include an edge strip 301, 311 engaging the recess 28. The edge strip 311 of each of the bent wall parts 31 is elongated in the circumferential direction of the gas generator 16 and suitably engages a recess of a neighboring wall part 30. In this arrangement the wall parts 30, 31 form a stable arrangement in the closed-hinge condition and produce an optimum flow of force between the individual parts (FIG. 4 and FIG. 6).

The cover 10 forms the impact plate in the steering wheel of a vehicle, it being fabricated of a material having differing degrees of hardness without any additional insertion parts and is produced by injection molding.

Each of the FIGS. 7 thru 9 show a wall part 30 of the formed edge strip 301, FIGS. 7 and 8 each illustrating a different shape of the hinge 32 connecting the cover 10 to the wall part 30. In accordance with FIG. 7 the hinge 32 is formed by an inner groove in the wall of the cover 10, whereas as shown in FIG. 8 the hinge 32 is formed by an outer groove in the wall of the cover 10. The recess 34 of the wall part 30 is restricted to such a degree in this arrangement that the fastener bolt 22 introduced in the opening 34 is clamped against a movement in the axial direction by the restriction 38 (FIG. 9). This restriction 38 is made up of a molded 45° chamfer anchored in the threads of the fastener bolt 22, thus preventing lifting of the bent wall parts 30.

In the production of the air bag restraining system according to the invention the gas generator 16 and the supporting plate 18 are preassembled as the first module, independently of which the anchoring plate 14 and the air bag 12 are preassembled as the second module.

To produce the first module the gas generator 16 is introduced into the prefabricated supporting plate 18 and then secured by caulking the casing 282 of the recess 28 so that the casing 282 encases the end wall 161 of the gas generator 16.

To produce the second module the anchoring plate 14 is introduced into the folded air bag 12 through the inflation opening 121 and the fastener bolts 22 are inserted from the inside through the openings in the air bag 12 until the anchoring plate 14 is in contact with the air bag 12. The gas bag 12 is then folded and sealed in a tearable plastic film 40 so that the air bag 12 is maintained in its folded condition during intermediate storage.

Figure 13:
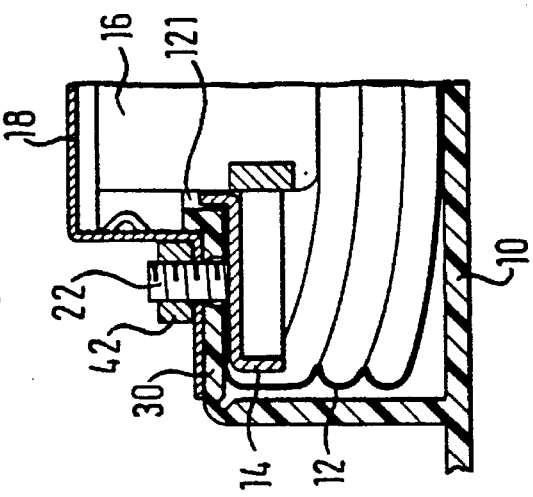
FIGS. 11 thru 13 are partial section views through the cover in differing states of assembly.
Figure 12:
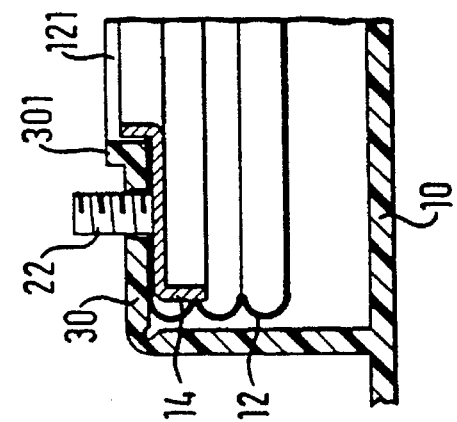
Figure 11:
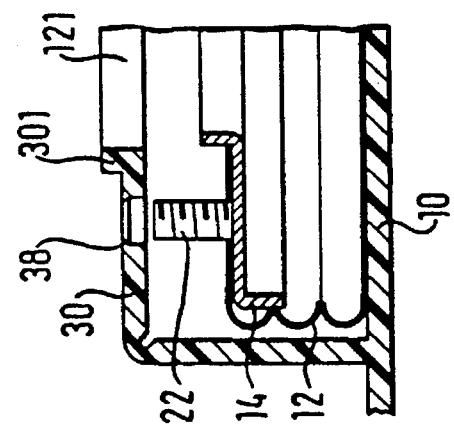

For assembly of the two modules the unit comprising the folded gas bag 12 and the anchoring plate 14 inserted in the air bag 12 is then placed in the cover 10, before the wall parts 30, 31 are hinged inwards. The insertion depth of the closed cover 10 must be greater than or equal to the overall height of the air bag 12 together with the anchoring plate 14 and its fastener bolts 22 to permit assembly, see FIGS. 11–13. Accordingly, the fastener bolts 22 come into place under the wall parts 30, 31 so that they can be introduced from the inside into the through-openings 34 in the wall section 30 (FIG. 11 thru FIG. 13). Since the fastener bolts 22 are then clamped by the restriction 38 the unit comprising cover 10, air bag 12 and anchoring plate 14 can be secured to the supporting plate 18 and the gas generator 16 without the fastener bolts 22 of the supporting plate 14 again moving out of the through-openings 34. The fastener bolts 22 are inserted through the through-openings 20 in the supporting plate 18 and then the nuts 42 screwed in place.

This inventive configuration of a air bag restraining system permits simple assembly and fabrication thereof. The gas generator 16 can be preassembled on the supporting plate 18 in the aforementioned way by caulking. In the same way the anchoring plate 14 and the air bag 12 can be assembled together with the cover 10 independently of the other assembly. Accordingly, both assemblies can be held in intermediate storage. It is also of advantage for assembly that the configuration according to the invention results in only one direction of assembly, i.e. in the axial direction of the gas generator 12. Yet a further advantage of the embodiment according to the invention is that the simple disassembly and separation of the modules concerned permits recycling of the components, particularly as regards separating the gas generator 12 from the other components as required for proper disposal.

What is claimed is:

1. An air bag restraining system for incorporation in a hub portion of a vehicle steering wheel, comprising a first preassembled unit comprising a mounting plate for mounting in the hub portion and a gas generator with a housing secured on said mounting plate, a second preassembled unit comprising a folded air bag with an inflation opening, a base member inserted into said folded air bag and a tearable plastic film, said folded air bag being sealed in said plastic film, said base member being provided with projecting fastener bolts extending through openings in said air bag, said base member having an opening aligned with said inflation opening and said gas generator having a housing portion extending through said opening of said base member and through said inflation opening into said folded air bag, said fastener bolts being engaged in through holes of said mounting plate, said base member being clamped against said mounting plate by nuts screwed onto said fastener bolts, said mounting plate being formed with a recess for accommodation of part of said gas generator housing, said gas generator having a flat bottom plate projecting beyond said housing with said bottom plate being retained in said recess by wall portions of said mounting plate which are caulked inwardly of said recess.

2. The air bag restraining system of claim 1, wherein a cover is fitted over said folded air bag, said cover having lug extensions bent inwards and clamped between said mounting plate and said base member.

3. The air bag restraining system of claim 2, wherein said lug extensions are provided with through holes for said fastener bolts.

4. The air bag restraining system of claim 1, wherein said mounting plate has a generally square main portion and tabs extending therefrom for fastening in the hub portion of the steering wheel.

5. A method of assembly of an air bag restraining system for incorporation in a hub portion of a steering wheel comprising:

assembling a first unit by connecting a mounting plate to a housing of a gas generator, said mounting plate having a plurality of openings;

assembling a second unit by inserting a base member having an opening into a folded air bag having an inflation opening so that said base member's opening is aligned with said air bag inflation opening and covering the outer surface of said folded air bag with a tearable plastic film in order to maintain said air bag in a folded condition, said base member having projecting fastener bolts extending through openings in said air bag when said base member is assembled to said air bag; and attaching said first unit to said second unit by inserting said housing of said gas generator into said opening of said base member and through said inflation opening of said folded air bag, passing said fastener bolts of said base plate into said plurality of openings of said mounting plate and clamping said base plate to said mounting plate by screwing nuts onto said fastener bolts.

6. The method of claim 1, wherein a cover is fitted over said folded air bag, said cover having lug extensions bent inwards and clamped between said mounting plate and said base member.

7. The method of claim 6, wherein said lug extensions are provided with through holes for said fastener bolts.

8. The method of claim 5, wherein said mounting plate is formed with a recess for accommodation of part of said gas generator housing.

9. The method of claim 8, wherein said gas generator has a flat bottom plate projecting beyond said housing and said bottom plate is retained in said recess by wall portions of said mounting plate which are caulked inwardly of said recess.

10. The method of claim 5, wherein said mounting plate has a generally square main portion and tabs extending therefrom for fastening in the hub portion of the steering wheel.

11. An air bag restraining system for incorporation in a hub portion of a vehicle steering wheel comprising:

a mounting plate having a plurality of openings and a recess, said mounting plate adapted to be mounted to the steering wheel;

a gas generator having a housing having an outer wall with inflation openings and with a flat bottom plate projecting beyond said wall;

wherein said gas generator is disposed within said recess of said mounting plate and attached to said mounting plate by crimped sections of said mounting plate retaining said flat bottom plate of said gas generator within said recess;

a folded air bag having an inflation opening and openings for fastener means;

a base member having an opening and a plurality of projecting fastener means, said base member being positioned within said air bag and adjacent said inflation opening of said air bag;

wherein said fastener means of said base member pass through said air bag fastener bolt openings and then through said plurality of openings of said mounting plate so that said base member is attached to said mounting plate with said air bag clamped between said base member and said mounting plate.

12. The air bag restraining system of claim 11, wherein a cover is fitted over said folded air bag, said cover having lug extensions bent inwards and clamped between said mounting plate and said base member.

13. The air bag restraining system of claim 12, wherein said lug extensions are provided with through holes for said fastener means.

14. The air bag restraining system of claim 11, wherein said mounting plate has a generally square main portion and tabs extending therefrom for fastening in the hub portion of the steering wheel.

* * * * *

UNITED STATES PATENT AND TRADEMARK OFFICE
CERTIFICATE OF CORRECTION

PATENT NO. : 5,562,301
DATED : October 8, 1996
INVENTOR(S) : Joachim Lutz

It is certified that error appears in the above-indentified patent and that said Letters Patent is hereby corrected as shown below:

Column 5, line 1, change "1" to --5--.

Signed and Sealed this

Twenty-seventh Day of May, 1997

Attest:

BRUCE LEHMAN

Attesting Officer

Commissioner of Patents and Trademarks